United States Patent [19]

Yagi et al.

[11] Patent Number: 5,672,025
[45] Date of Patent: Sep. 30, 1997

[54] WATERPROOF CONNECTOR HOUSING, AND METHOD AND MOLD FOR PRODUCING SAME

[75] Inventors: Sakai Yagi; Motohisa Kashiyama, both of Shizuoka, Japan

[73] Assignee: Yazaki Corporation, Tokyo, Japan

[21] Appl. No.: 566,437

[22] Filed: Nov. 30, 1995

[30] Foreign Application Priority Data

Dec. 5, 1994 [JP] Japan .................................. 6-300763

[51] Int. Cl.$^6$ ............................ H01R 13/52; H01R 43/24
[52] U.S. Cl. ........................... 403/288; 403/269; 403/265; 264/250; 425/129.1
[58] Field of Search ....................... 425/120, 129.1; 264/267, 250, 273, 274; 403/288, 267, 269, 265

[56] References Cited

U.S. PATENT DOCUMENTS

| | | | |
|---|---|---|---|
| 4,338,278 | 7/1982 | Schultz | 264/274 X |
| 4,842,540 | 6/1989 | Endo et al. | |
| 5,008,060 | 4/1991 | Kanai et al. | 425/129.1 X |
| 5,057,263 | 10/1991 | Bengtsson | 264/274 X |
| 5,334,039 | 8/1994 | Kanda | 264/273 X |
| 5,472,655 | 12/1995 | Morita | 425/129.1 X |

FOREIGN PATENT DOCUMENTS

| | | |
|---|---|---|
| 63-221568 | 9/1988 | Japan . |
| 3-219578 | 9/1991 | Japan . |

*Primary Examiner*—Anthony Knight
*Attorney, Agent, or Firm*—Sughrue, Mion, Zinn, Macpeak & Seas, PLLC

[57] ABSTRACT

In a waterproof connector housing, an elastic seal ring is integrally formed on an inner side of a hood formed at a front end of a housing body through a first stepped portion, and is retained in position by retaining piece portions. A second stepped portion is formed in the hood at a proximal end, and through holes are formed in the hood. The through holes have a transverse hole extending to a point, disposed generally centrally of a thickness of a peripheral wall of the hood, in parallel relation to a distal end surface of the step portion, and a longitudinal hole extending from the transverse hole in a direction of fitting of the housing to further extend through the first stepped portion to be open to the exterior. The retaining piece portion has a transverse portion and a longitudinal portion which are filled in the through hole. The transverse portion is projected at a distal end portion of the elastic seal ring.

5 Claims, 4 Drawing Sheets

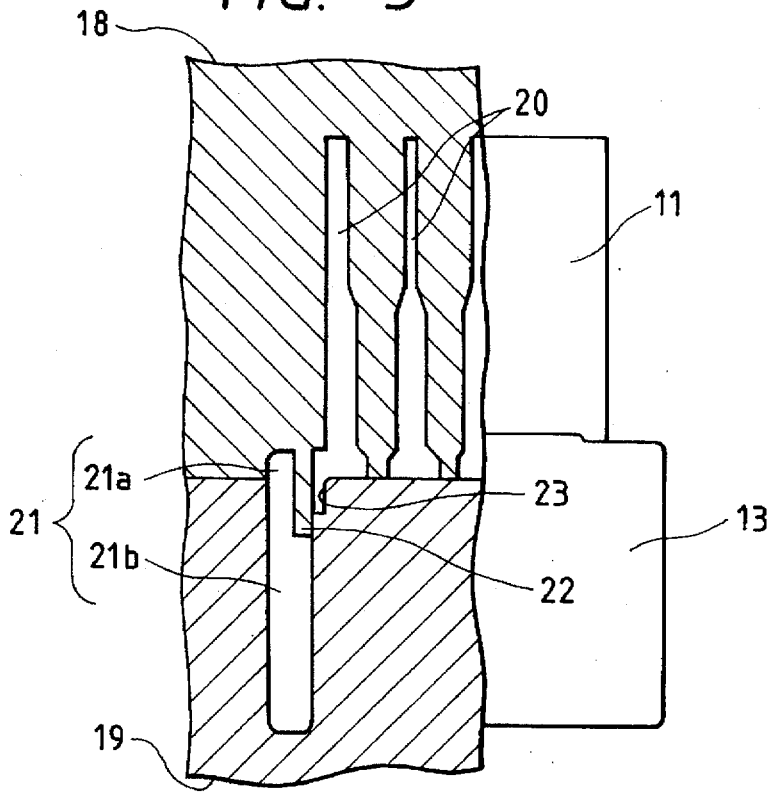
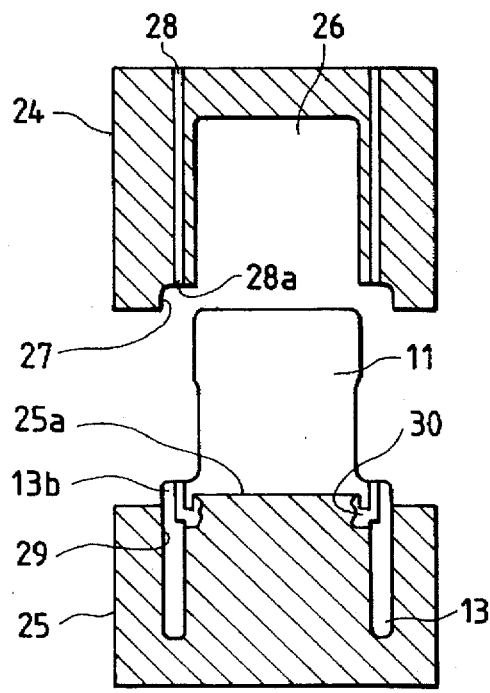
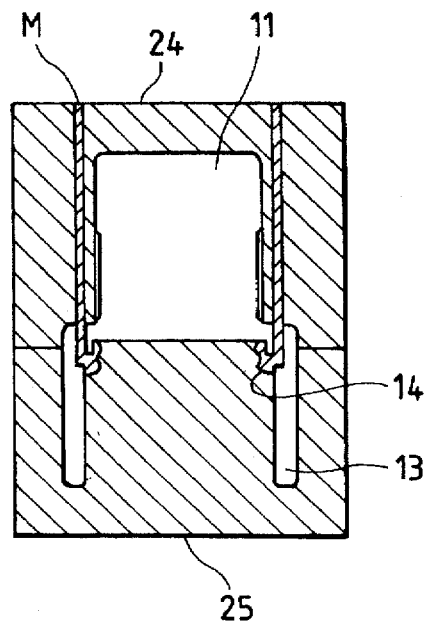

WATERPROOF CONNECTOR HOUSING, AND METHOD AND MOLD FOR PRODUCING SAME

BACKGROUND OF THE INVENTION

1. Field of the invention

This invention relates to a waterproof connector housing having an elastic seal ring mounted within a hood for fitting on a mating connector. The seal ring forms a watertight seal between the connector housing and the mating housing. The invention also relates to a method and a mold for producing such a waterproof connector housing.

2. Related art

One conventional production method of the type described is disclosed in Japanese Patent Unexamined Publication No. 3-219578.

FIG. 6(A) shows a waterproof connector housing A produced by this method. In this housing A, a hood 3 of a larger size for receiving a mating connector housing is formed at a front end of a housing body 1 through a first stepped portion $2_1$, and an elastic seal ring 4 is integrally formed between a proximal end of the hood 3 (that is, the first stepped portion $2_1$) and a second stepped portion $2_2$. The elastic seal ring 4 has retaining piece portions 4a intimately engaged respectively in through holes 3a formed through the hood 3, the axes of the through holes 3a being perpendicular to an axis of the fitting of the housing. The housing body 1 has terminal receiving chambers 1a formed therein.

In this waterproof connector housing A, the housing body 1 and the hood 3 are molded in a primary molding step, and then the elastic seal ring 4 is molded in a secondary molding step. In the primary molding step, upper and lower molds (not shown) are clamped or closed together in a direction of the axis of the housing A to be molded, and then the connector housing is injection molded according to an ordinary procedure. At this time, slide molds for sliding movement in directions perpendicular to the above axial direction are provided between the upper and lower molds, and passages 3a for feeding an elastic material to a seal ring-forming portion on the inner side of the hood 3 are formed by these slide molds. The passages 3a also serve as retaining holes for the retaining piece portions 4a.

FIG. 6(B) shows the secondary molding operation. More specifically, an upper mold 5, having a cavity 6 corresponding to the elastic seal ring-forming portion, is clamped to a lower mold 7 holding the housing body 1, and the liquid elastic material is fed into the seal ring-forming portion (the cavity 6) through a gate 9a of a runner 9 (formed in the slide mold 8) and the passages 3a in the hood 3.

In the primary molding step, axially-extending projections (not shown) are formed at the first and second stepped portions $2_1$ and $2_2$ of the housing A, and a similar projection is formed on the outer surface of the housing (to which outer ends of the passages 3a are open) over the entire periphery thereof. In the mold clamping, the upper mold 5 and the slide molds 8 crush these projections to intimately contact them, thereby preventing the leakage of the liquid elastic material of high fluidity.

In the above conventional production method, however, in the primary molding step, the injection ports (through holes 3a) for forming the elastic seal ring 4 are provided respectively at the opposite sides of the housing, and therefore the molds for forming the housing are complicated in construction, and the mold cost is high. And besides, in the secondary molding step of forming the elastic seal ring 4, there must be used the slide molds 8 slidable perpendicularly to the direction of clamping of the upper and lower molds 5 and 7. Therefore, these molds are also complicated in construction, and the manufacturing cost of these molds is high.

Japanese Patent Unexamined Publication No. 3-219578 also discloses a housing B (see FIG. 7) in which retaining piece portions 4a' of an elastic seal ring 4' are retained respectively in transverse holes 3a' formed in a bottom of a hood, and further discloses a housing C (see FIGS. 8(A) and 8(B)) in which retaining piece portions 4a" of an elastic seal ring 4" are retained respectively in longitudinal holes 3a" formed in a bottom of a hood. In FIG. 8(B), reference numerals 5', 7' and 9' denote an upper mold, a lower mold, and a runner, respectively. However, in these elastic seal rings 4' and 4", their retaining portions P are formed at the proximal end thereof, and therefore during the time when the connector housing is fitted relative to the mating connector housing, a distal end Q of the elastic seal ring 4', 4" is turned back, which has resulted in problems that the fitting operation can not be carried out easily, and that an adequate watertight effect can not be obtained. With this construction of the retaining portion P of the elastic seal ring 4', 4", there is only provided a relatively weak retaining force acting in the direction of the axis of the housing, and therefore there has been encountered a further problem that the seal ring remains in the mold when the housing is removed from the mold.

SUMMARY OF THE INVENTION

The present invention has been made in view of the above problems of the prior art, and an object of the invention is to provide a waterproof connector housing provided with an elastic seal ring which is retained on the housing with a large retaining force acting in a direction of the axis of the connector housing, and will not be turned back when the connector housing is fitted relative to a mating connector housing, thus providing a good watertight effect.

Another object of the invention is to provide a method and a mold in which primary and secondary molds are simplified in construction so that the waterproof connector housing can be produced at lower costs.

To achieve the above object, the present invention provides a waterproof connector housing wherein a hood of a larger size for fitting on a mating connector housing is formed at a front end of a housing body through a stepped portion; and an elastic seal ring for forming a watertight seal between said waterproof connector housing and said mating connector housing is formed on an inner side of said hood; and retaining piece portions of said elastic seal ring are engaged with said hood, wherein said hood has a step portion formed therein at a proximal end thereof, and has through holes each having a transverse hole extending to a point, disposed generally centrally of a thickness of a peripheral wall of said hood, in parallel relation to a distal end surface of said step portion and a plane of contact between said housing body and said mating connector housing, and a longitudinal hole extending from said transverse hole in a direction of fitting of said housing to further extend through said stepped portion to be open to the exterior; and said retaining piece portion of said elastic seal ring has a transverse portion filled in said transverse hole of said through hole, and a longitudinal portion filled in said longitudinal hole; said transverse portion being projected at a distal end of said, elastic seal ring to face said mating housing.

The present invention provides a method of producing a waterproof connector housing, which comprises a primary molding step of molding the connector housing, and a secondary molding step of molding the elastic seal ring on the inner side of the hood formed at the front end of the housing body, wherein, in the primary molding step, the step portion is formed on the inner periphery of the hood at the proximal end thereof, and also the through holes for feeding an elastic material from the outside of the hood to a seal ring-forming portion in the hood are formed in the proximal end portion of the hood, said through hole having the transverse hole extending to a point, disposed generally centrally of the thickness of the peripheral wall of the hood, in parallel relation to the distal end surface of the step portion and the plane of contact between the housing body and the mating connector housing, and the longitudinal hole extending from the transverse hole in the direction of fitting of the housing to further extend through the stepped portion to be open to the exterior.

The present invention provides a primary mold for performing the above method, which comprises an upper mold and a lower mold, said upper mold having a first cavity corresponding to a housing body-forming portion, and a second cavity corresponding to a hood proximal end portion-forming portion, said lower mold having a third cavity corresponding to a hood main portion-forming portion, said upper mold having longitudinal hole-forming projections which project into said third cavity in contact with an inner peripheral surface thereof when said upper and lower molds are mated together, and a step portion-forming notch being formed in a corner portion of said lower mold facing said longitudinal hole-forming projections.

The invention provides a secondary mold which comprises an upper mold and a lower mold, said upper mold having a first recess for receiving the housing body, a second recess of a larger diameter for receiving the proximal end portion of the hood being formed around a peripheral edge of an open end of said first recess over an entire periphery thereof, said lower mold having a third recess for receiving the main portion of the hood, and a fourth recess which corresponds to an elastic seal ring-forming portion when said upper and lower molds are clamped together, runners being formed in said upper mold, and extending in the direction of the axis of the housing, and when said upper and lower molds are clamped together, said runners communicating at their lower ends with the longitudinal holes, respectively.

In the present invention, each of the retaining piece portions of the elastic seal ring formed integrally on the inner side of the hood has the transverse portion, which extends perpendicularly to the housing axis from the outer side of the distal end portion of the seal ring into the peripheral wall of the hood (that is, into the point generally centrally of the thickness of this peripheral wall), and the longitudinal portion which extends from the transverse portion in the direction of the axis of the housing, and further extends through the stepped portion (the bottom wall of the hood) to be open to the exterior.

Therefore, the retaining force to retain the elastic seal ring relative to the connector housing in the axial direction is high, and when the connector housing is fitted relative to the mating connector housing, the distal end portion of the elastic seal ring will not be turned back, and the two connector housings can be easily connected together and disconnected from each other, and a stable watertight effect can be achieved.

In the present invention, in the secondary molding step, the transverse portion of the retaining piece portion is formed by the transverse hole formed at the area of intersection between the step portion and the inner peripheral surface of the hood. The longitudinal portion Of the retaining piece portion is formed by the longitudinal hole which extends through the bottom wall of the hood in parallel relation to the housing axis, and communicates with the transverse hole.

Therefore, in the primary molding step of forming the housing body and the hood, as well as in the secondary molding step of forming the elastic seal ring, the molding can be effected only by the use of the upper and lower molds movable in the direction of the axis of the housing. Thus, there is no need to use any slide mold (slidable perpendicularly to the housing axis) as used in the conventional method. Therefore, the molds are simplified in construction, and hence the cost of the molds is greatly reduced, and the manufacturing cost of the waterproof connector housing can be reduced.

In the present invention, the primary mold comprises the upper mold and the lower mold, and the upper mold has the first cavity corresponding to the housing body-forming portion, and the second cavity corresponding to the hood proximal end portion-forming portion, and the lower mold has the third cavity corresponding to the hood main portion-forming portion. The upper mold has longitudinal hole-forming projections which project into the third cavity in contact with the inner peripheral surface thereof when the upper and lower molds are mated together. The step portion-forming notch is formed in the corner portion of the lower mold facing the longitudinal hole-forming projections. Therefore, when the upper and lower molds are clamped together, this primary mold has the cavities corresponding to the housing-forming portion for forming the housing body and the hood. Moreover, the longitudinal hole-forming projections are formed on the upper mold, and the step portion-forming notch is formed in the corner portion of the lower mold, and therefore the transverse and longitudinal holes for forming the retaining piece portions can be formed merely by clamping the upper and lower molds together in the direction of the axis of the housing.

When the upper and lower molds for secondary molding purposes are clamped together, there is formed the recess corresponding to the seal ring-forming portion. As in the primary mold, the transverse and longitudinal portions of the retaining piece portions can be formed merely by clamping the upper and lower molds together in the direction of the axis of the housing.

BRIEF DESCRIPTION OF THE DRAWINGS

FIG. 3 is a cross-sectional view of an important portion of a mold used for the primary molding of the connector housing of FIG. 2;

FIG. 4 is a cross-sectional view of a mold in its separated condition, which is used for a secondary molding step of the method of the invention;

FIG. 5 is a cross-sectional view of the mold of FIG. 4 in its clamped condition, showing the secondary molding step;

DETAILED DESCRIPTION OF THE PREFERRED EMBODIMENTS

Figure 1A:
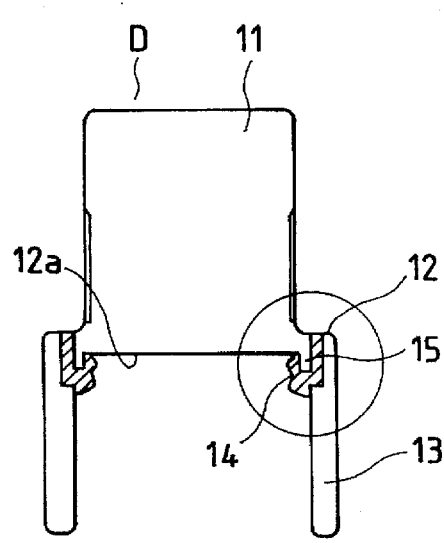
FIG. 1(A) is a cross-sectional view of a waterproof connector housing produced by a method of the present invention.
Figure 1B:
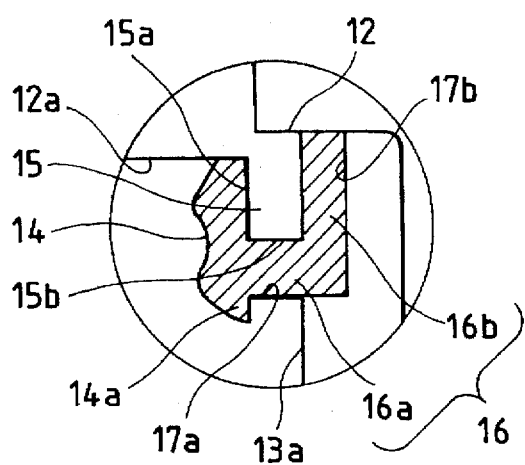
FIG. 1(B) is an enlarged, cross-sectional view of an important portion of the connector housing.
Figure 2:
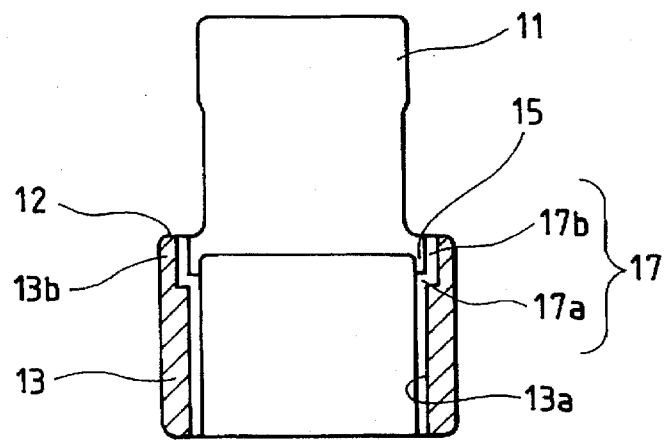
FIG. 2 is a view of the connector housing molded by a primary molding step of the method of the invention, with an important portion thereof shown in cross-section.
Figure 6A:
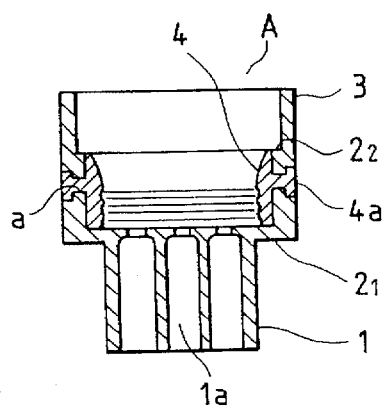
FIG. 6(A) is a cross-sectional view of a conventional waterproof connector housing.
Figure 6B:
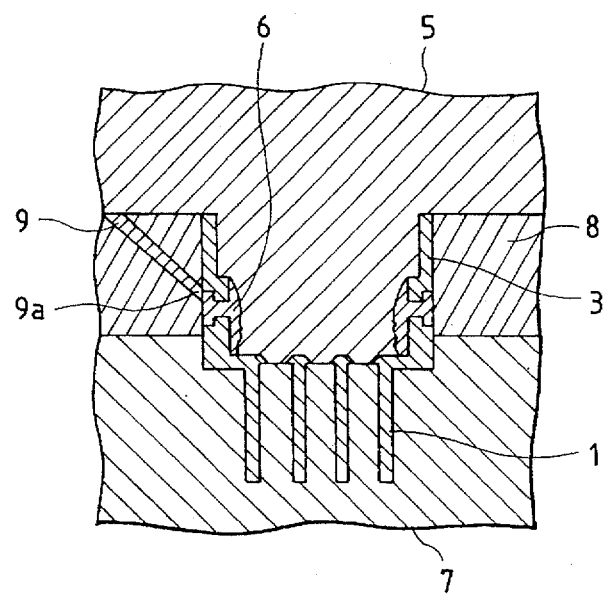
FIG. 6(B) is a cross-sectional view of a mold used in a secondary molding step thereof.
Figure 7:
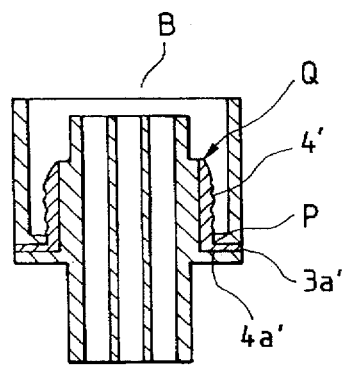
FIG. 7 is a cross-sectional view of another conventional waterproof connector housing.
Figure 8A:
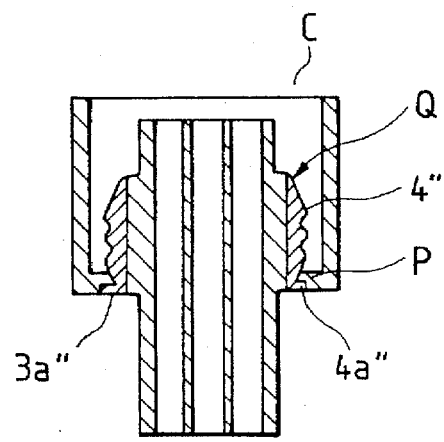
FIG. 8(A) is cross-sectional view of a further conventional waterproof connector housing.
Figure 8B:
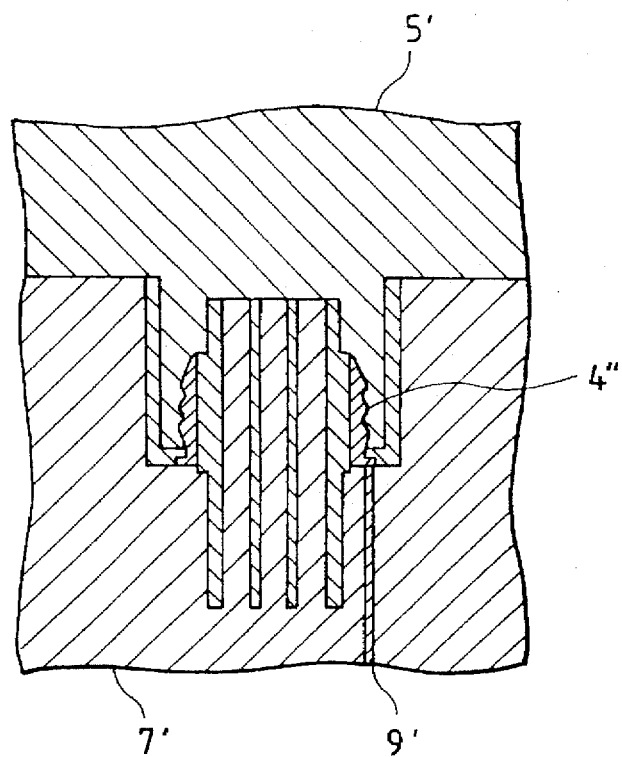
FIG. 8(B) is a cross-sectional view of a mold used in a secondary molding step for the housing of FIG. 8(A).

FIG. 1(A) is a cross-sectional view of a waterproof connector housing D of the invention produced by a two-stage (primary and secondary) molding operation, FIG. 1(B) is an enlarged, cross-sectional view of an important portion thereof, FIG. 2 is a cross-sectional view of the connector housing produced by the primary molding step, and FIG. 3 is a cross-sectional view of an important portion of a primary mold.

The housing D includes a housing body 11 having a plurality of terminal receiving chambers (not shown) formed therein, and a hood 13 of a larger size formed at a front end of the housing body 11 through a first stepped portion 12. An elastic seal ring 14 is formed integrally at a proximal end portion of the hood 13, and is retained on the hood 13 by retaining piece portions 16.

A step portion 15 is formed at the proximal end of the hood 13, and projects a predetermined distance from an inner surface 12a of the stepped portion 12 which defines a plane of contact between the housing body 11 and a mating connector housing. The elastic seal ring 14 projects slightly beyond the distal end of the step portion 15, and is disposed in contact with an inner peripheral surface 15a of the step portion 15 over an entire periphery thereof.

The retaining piece portion 16 includes a transverse portion 16a and a longitudinal portion 16b. The transverse portion 16a extends from the outer surface of the elastic seal ring 14 toward the hood 13, and bites into the inner peripheral surface of the hood 13. The longitudinal portion 16b extends from a distal end of the transverse portion 16a in parallel relation to the axis of the housing, and is exposed to an outer surface of the stepped portion 12.

More specifically, the hood 13 has through holes 17 each defined by a transverse hole 17a, extending along a distal end surface 15b of the step portion 15 into the inner peripheral surface of the hood 13, and a longitudinal hole 17b extending from a distal end of the transverse hole 17a to the outer surface of the stepped portion 12 through the stepped portion 12. A longitudinal inner side of the inner surface (bore) of the longitudinal hole 17b is disposed in registry with an inner peripheral surface 13a of the hood 13 along the axis of the housing. The transverse portion 16a and longitudinal portion 16b of the retaining piece portion 16 are snugly engaged in the transverse hole 17a and the longitudinal hole 17b, respectively.

In FIG. 3, a primary mold comprises an upper mold 18 and a lower mold 19. The upper mold 18 has a first cavity 20 corresponding to a housing body-forming portion to form the housing body 11, and a second cavity 21a corresponding to a hood proximal end portion-forming portion to form the proximal end portion 13b of the hood 13. The lower mold 19 has a third cavity 21b corresponding to a hood main portion-forming portion to form the main portion of the hood 3.

When the upper and lower molds 18 and 19 are clamped together, the cavities 21a and 21b jointly form a cavity 21 corresponding to the whole of the hood.

The upper mold 18 has longitudinal hole-forming projections 22 which project into the third cavity 21b in contact with the inner peripheral surface thereof when the two molds are clamped or mated together. A step portion-forming notch 23 is formed in a corner portion of the lower mold 19 facing the longitudinal hole-forming projections 22. The depth of the step portion-forming notch 23 is smaller than the depth of projecting of the projection 22. With this arrangement, the transverse hole 17a communicating with the longitudinal hole 17b can be formed at the region of contact between the longitudinal hole-forming projection 22 and the lower mold 19.

As is clear from the structure of the primary mold shown in FIG. 3, the housing body 11, having the step portion 15 and the transverse and longitudinal holes 17a and 17b in the hood 13, can be easily formed by moving one or both of the upper and lower molds 18 and 19 for clamping purposes in the direction of the axis of the housing. Thus, the need for slide molds (slidable in directions perpendicular to the axis of the housing) as used in the conventional method is obviated, and the construction of the molds is simplified.

In FIG. 4, a secondary mold for forming the elastic seal ring comprises an upper mold 24 and a lower mold 25.

The upper mold 24 has a first recess 26 for receiving the housing body 11, and a second recess 27 of a larger diameter for receiving the proximal end portion 13b of the hood 13 is formed around a peripheral edge of an open end of the first recess 26 over an entire periphery thereof. Runners 28 are formed in the upper mold 24, and extend in the direction of the axis of the housing, and when the molds are clamped together, the runners communicate at their lower ends with the longitudinal holes 17b, respectively.

The lower mold 25 has a third recess 29 for receiving the main portion of the hood 13, and a fourth recess 30 which corresponds to the elastic seal ring-forming portion when the molds are clamped together.

Next, the second molding step will now be described with reference to FIGS. 4 and 5.

The connector housing, obtained in the above primary molding step, is held on the lower mold 25, with the main portion of the hood 13 inserted in the third recess 29 in the lower mold 25. Then, the upper mold 24, having the first and second recesses 26 and 27 for respectively receiving the housing body 11 and the proximal end portion 13b of the hood 13, is clamped relative to the lower mold 25.

In this condition, an elastic material M of high fluidity, such as liquid silicone and a thermoplastic elastomer, is filled in the fourth recess 30 through the runners 28, their open ends (gates) 28a, the longitudinal holes 17b and the transverse holes 17a.

The elastic material is high in fluidity; however, the upper and lower molds 24 and 25 are intimately held together, and the internal space of the housing body 11 is sealed or closed by an end surface 25a of the lower mold 25, and therefore the elastic material will not leak through the area of contact between the molds.

After the elastic material is cured or set, the mold is opened, with the molded product held on the lower mold 25, and the cured material is ejected toward the upper mold 24 by ejector pins (not shown), and the elastic material M cured in the runners 28 is separated from the molded elastic seal ring 14 at the gates 28a, and the molded product is removed from the lower mold 25.

In this manner, the waterproof connector housing D (see FIG. 1), having the elastic seal ring 14 integrally molded on the inner side of the hood 13, is obtained.

The upper and lower molds 18 and 19 for the primary molding, as well as the upper and lower molds 24 and 25 for the secondary molding, need only to be clamped together in the direction of the axis of the housing, and any slide mold (slidable in the transverse direction) as used in the conventional method is not needed. Therefore, the molds are simplified in construction, and the cost of the molds can be greatly reduced.

The distal or front end portion of the elastic seal ring 14 to face the mating housing is retained at its outer side by the transverse portions 16a of the retaining piece portions 16, and therefore this distal end portion will not be turned back when the mating housing is fitted into the hood, thereby achieving a stable watertight effect.

Further, the proximal end portion of the elastic seal ring 14 disposed rearwardly of the transverse portion 16a is supported at its outer side by the inner peripheral surface 15a of the step portion 15, whereas a gap is formed between the distal end portion 14a of the elastic seal ring 14 and the inner peripheral surface 13a of the hood 13, so that the distal end portion 14a can be flexed or deformed into this gap. Therefore, when the connector housing is fitted relative to the mating connector housing, the distal end portion 14a of the elastic seal ring 14 is displaced rearwardly, and therefore the fitting operation can be carried out quite smoothly.

As described above, in the present invention, the retaining force acting in the direction of the axis of the connector housing is sufficiently large that there is no fear that the elastic seal ring remains in the mold when the molded product is removed from the mold. There is provided the waterproof connector housing in which the distal end portion of the elastic seal ring will not be turned back upon fitting on the mating connector, so that the watertight effect will not be affected, and besides the fitting operation can be carried out easily and smoothly.

In each of the primary and secondary molding steps, there is no need to use any slide mold slidable perpendicularly to the axis of the connector housing, and the two molds are only required to be clamped together in the direction of the axis of the housing. Therefore, the molds are simplified in construction, and the cost of the molds is greatly reduced, and therefore the waterproof connector housing can be produced at low costs.

What is claimed is:

1. A waterproof connector for connection with a mating connector housing, said waterproof connector comprising:
   a housing body;
   a hood comprising a peripheral wall formed at an end of the housing body and connected to the end of the housing body through a first stepped portion, said hood having a second stepped portion inside the hood adjacent to said first stepped portion, and having through holes each having a transverse hole extending to a point, disposed generally centrally of a thickness of a peripheral wall of said hood, in parallel relation to an end surface of said second stepped portion and a plane of contact between said housing body and the mating connector housing, and a longitudinal hole communicating with said transverse hole and extending from said transverse hole in an insertion direction of said waterproof connector so as to extend through said first stepped portion and open to an exterior of said waterproof connector;
   an elastic seal ring for forming a watertight seal between said waterproof connector and the mating connector housing, said elastic seal ring being disposed on an inner surface of said hood, said elastic seal ring being filled in said through holes, said elastic seal ring having a retaining piece portion engaged with said hood.

2. A waterproof connector as claimed in claim 1, wherein the retaining piece portion of said elastic seal ring includes a transverse portion filled in said transverse hole of said through hole and a longitudinal portion filled in said longitudinal hole, and said transverse portion protrudes inside said hood beyond the inner surface of said hood for sealing a connection between said waterproof connector and the mating connector.

3. A method of producing a waterproof connector for connection with a mating connector housing, said method comprising the steps of:
   a primary molding step comprising molding a connector housing, said primary step including forming a first stepped portion connecting a body of the connector housing with a hood of the connector housing, forming a second stepped portion on an inner periphery of the hood of the connector housing at a proximal end portion of the hood, and forming through holes for feeding an elastic material from an outside of the hood to a seal ring-forming portion in the hood, the seal ring-forming portion being disposed at the proximal end portion of the hood, the through holes including a transverse hole extending to a point, disposed generally centrally of a thickness of a peripheral wall of the hood, in parallel relation to an end surface of the second stepped portion and a plane of contact between the waterproof connector and the mating connector housing, and a longitudinal hole communicating with the transverse hole and extending from the transverse hole in an insertion direction of the waterproof connector so as to extend through the first stepped portion and open to an exterior of the waterproof connector; and
   a secondary molding step comprising feeding the elastic material in the through holes to form the elastic seal ring on an inner surface of the hood.

4. A mold for molding a waterproof connector housing, said mold comprising:
   a primary mold for primary molding, said primary mold comprising:
   an upper mold and a lower mold, said upper mold having a first cavity corresponding to a housing body-forming portion for forming a housing body of the connector, and a second cavity corresponding to a hood proximal end portion-forming portion for forming a proximal end portion of a hood of the connector, said lower mold having a third, annular cavity corresponding to a hood main portion-forming portion for forming a main portion of a hood of the connector, said upper mold having longitudinal hole-forming projections which project into the third cavity in contact with an inner peripheral surface of the third cavity when said upper and lower molds are mated together to form longitudinal holes, and a step portion-forming notch being formed in a corner portion of said lower mold facing said longitudinal hole-forming projections.

5. A mold as claimed in claim 4, further comprising:
   a secondary mold for secondary molding, said secondary mold comprising:
   an upper mold and a lower mold, said upper mold having a first recess for receiving the housing body, a second recess of a larger diameter for receiving the proximal end portion of the hood, the second recess being formed around a peripheral edge of an open end of the first recess over an entire periphery of the first recess, said lower mold having a third recess for receiving the main portion of the hood, and a fourth recess which corresponds to an elastic seal ring-forming portion when said upper and lower molds are clamped together, wherein runners are disposed in said upper mold, the runners being disposed so that when said upper and lower molds are clamped together, the runners communicate with the longitudinal holes.

* * * * *